(12) United States Patent
Doan et al.

(10) Patent No.: US 8,576,755 B2
(45) Date of Patent: Nov. 5, 2013

(54) APPARATUS AND METHOD FOR RELAY TRANSITION TIME

(75) Inventors: Dung Ngoc Doan, San Diego, CA (US); Wanshi Chen, San Diego, CA (US); Ravi Palanki, San Diego, CA (US); Parag Arun Agashe, San Diego, CA (US); Aamod Dinkar Khandekar, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 12/987,451

(22) Filed: Jan. 10, 2011

(65) Prior Publication Data

US 2011/0170436 A1 Jul. 14, 2011

Related U.S. Application Data

(60) Provisional application No. 61/294,082, filed on Jan. 11, 2010, provisional application No. 61/315,820, filed on Mar. 19, 2010, provisional application No. 61/320,998, filed on Apr. 5, 2010.

(51) Int. Cl.
*H04J 1/00* (2006.01)
(52) U.S. Cl.
USPC .......................... 370/281; 370/343; 370/345

(58) Field of Classification Search
USPC .................. 370/252, 281, 343, 345, 400, 401
See application file for complete search history.

(56) References Cited

U.S. PATENT DOCUMENTS

| 2008/0232234 A1* | 9/2008 | McCoy et al. ................ 370/203 |
| 2009/0122731 A1* | 5/2009 | Montojo et al. .............. 370/280 |
| 2011/0080896 A1* | 4/2011 | Krishnamurthy et al. .... 370/336 |

FOREIGN PATENT DOCUMENTS

| EP | 1915005 A2 | 4/2008 |
| WO | WO2009041881 A2 | 4/2009 |

OTHER PUBLICATIONS

International Search Report and Written Opinion—PCT/US2011/020888, ISA/EPO—Apr. 20, 2011.

* cited by examiner

*Primary Examiner* — Kerri Rose
(74) *Attorney, Agent, or Firm* — Michael J. DeHaemer, Jr.

(57) ABSTRACT

An apparatus and method for establishing a relay transition time in a network node in a wireless communication system comprising comparing a network node transmit/receive (TX/RX) switch time to a switch threshold; and using a fraction of the cyclic prefix (CP) as a guard period if the network node TX/RX switch time is less than or equal to the switch threshold, or using a sounding reference signal (SRS) configured channel to blank out a last symbol if the network node TX/RX switch time is greater than the switch threshold.

50 Claims, 11 Drawing Sheets

Normal CP Pattern

Extended CP Pattern (based on normal CP pattern)

APPARATUS AND METHOD FOR RELAY TRANSITION TIME

CLAIM OF PRIORITY UNDER 35 U.S.C. §119

The present application for patent claims priority to Provisional Application No. 61/294,082 entitled Apparatus and Method for Relay Transition Time filed Jan. 11, 2010; to Provisional Application No. 61/315,820 entitled Apparatus and Method for Relay Transition Time filed Mar. 19, 2010; and to Provisional Application No. 61/320,998 entitled Apparatus and Method for Relay Transition Time filed Apr. 5, 2010 all of which are assigned to the assignee hereof and hereby expressly incorporated by reference herein.

FIELD

This disclosure relates generally to apparatus and methods for accommodating duplex relay communication in a wireless communication system. More particularly, the disclosure relates to establishing a relay transition time in a half-duplex frequency division duplex (FDD) relay node (RN) in a Long Term Evolution-Advanced (LTE-A) wireless system.

BACKGROUND

Wireless communication systems are widely deployed to provide various types of communication content such as voice, video, data, etc. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, $3^{rd}$ Generation Partnership Project (3GPP) Long Term Evolution (LTE) systems, and orthogonal frequency division multiple access (OFDMA) system.

In general, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output (SISO), multiple-input single-output (MISO) or a multiple-input multiple-output (MIMO) system.

SUMMARY

Disclosed is an apparatus and method for relay transition time. According to one aspect, a method for establishing a relay transition time in a network node in a wireless communication system comprising comparing a network node transmit/receive (TX/RX) switch time to a switch threshold; and using a fraction of the cyclic prefix (CP) as a guard period if the network node TX/RX switch time is less than or equal to the switch threshold, or using a sounding reference signal (SRS) configured channel to blank out a last symbol if the network node TX/RX switch time is greater than the switch threshold.

According to another aspect, an apparatus for establishing a relay transition time in a network node in a wireless communication system comprising means for comparing a network node transmit/receive (TX/RX) switch time to a switch threshold; means for using a fraction of the cyclic prefix (CP) as a guard period if the network node TX/RX switch time is less than or equal to the switch threshold; and means for using a sounding reference signal (SRS) configured channel to blank out a last symbol if the network node TX/RX switch time is greater than the switch threshold.

According to another aspect, an apparatus for establishing a relay transition time in a network node in a wireless communication system, the apparatus comprising a processor and a memory, the memory containing program code executable by the processor for performing the following: comparing a network node transmit/receive (TX/RX) switch time to a switch threshold; and using a fraction of the cyclic prefix (CP) as a guard period if the network node TX/RX switch time is less than or equal to the switch threshold, or using a sounding reference signal (SRS) configured channel to blank out a last symbol if the network node TX/RX switch time is greater than the switch threshold.

According to another aspect, a computer-readable medium storing a computer program, wherein execution of the computer program is for comparing a network node transmit/receive (TX/RX) switch time to a switch threshold; and using a fraction of the cyclic prefix (CP) as a guard period if the network node TX/RX switch time is less than or equal to the switch threshold, or using a sounding reference signal (SRS) configured channel to blank out a last symbol if the network node TX/RX switch time is greater than the switch threshold.

Advantages of the present disclosure may include enabling relay usage without change in existing wireless protocols and/or architecture and providing extended radio coverage for more users.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
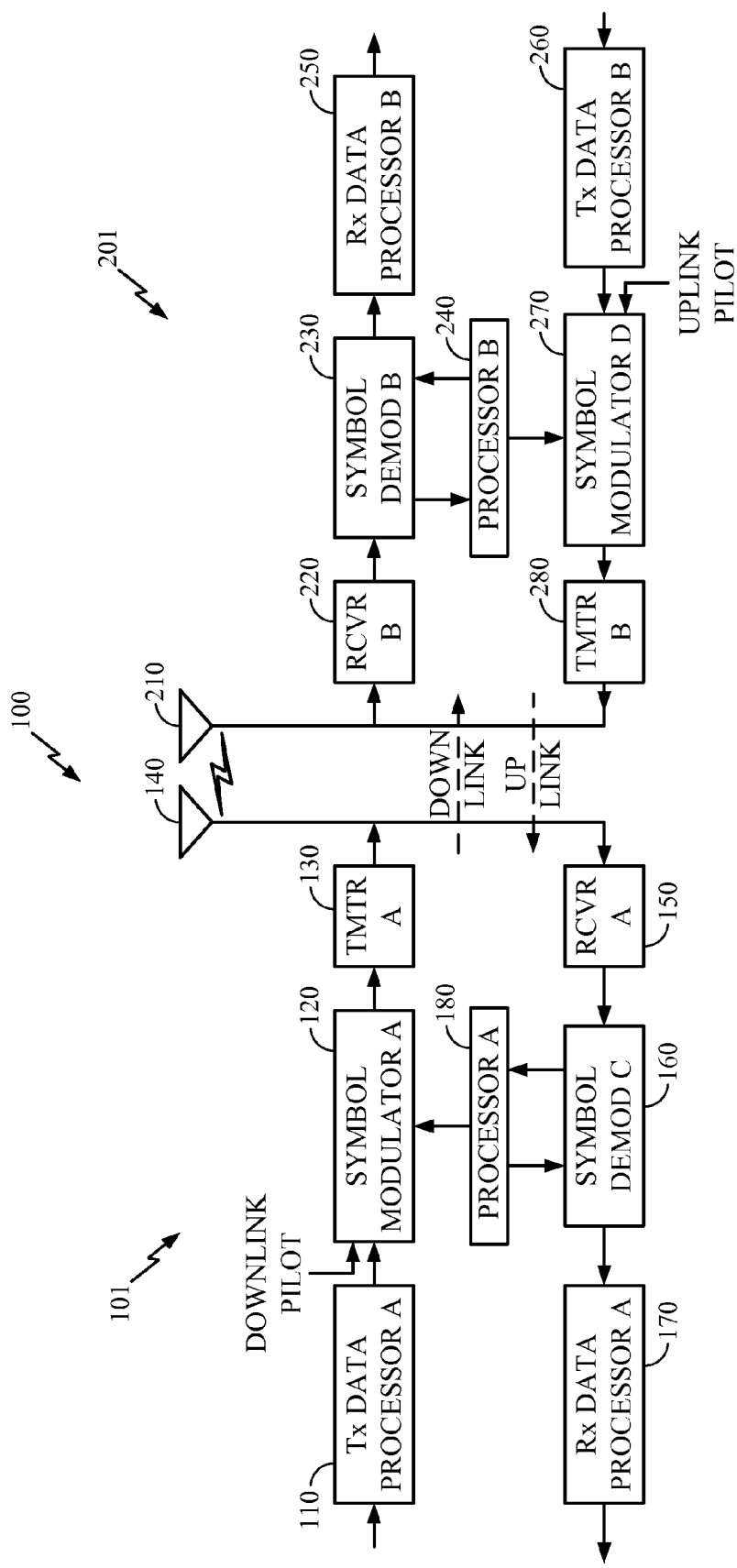
FIG. 1 illustrates an example block diagram of a wireless communication system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

FIG. 1 illustrates an example block diagram of a wireless communication system 100. One skilled in the art would understand that the example two terminal system 100 illustrated in FIG. 1 may be implemented in an FDMA environment, an OFDMA environment, a CDMA environment, a WCDMA environment, a TDMA environment, a SDMA environment or any other suitable wireless environment.

In one aspect, the two terminal system 100 includes an access node 101 (e.g., base station or Node B) and a user equipment or UE 201 (e.g., user device). In the downlink leg, the access node 101 (e.g., base station or Node B) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 (e.g., user device) includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 (e.g., user device) includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 (e.g., user device) is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station or Node B) and at the UE 201 (e.g., user device), respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the two terminal system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs (e.g., user devices). In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
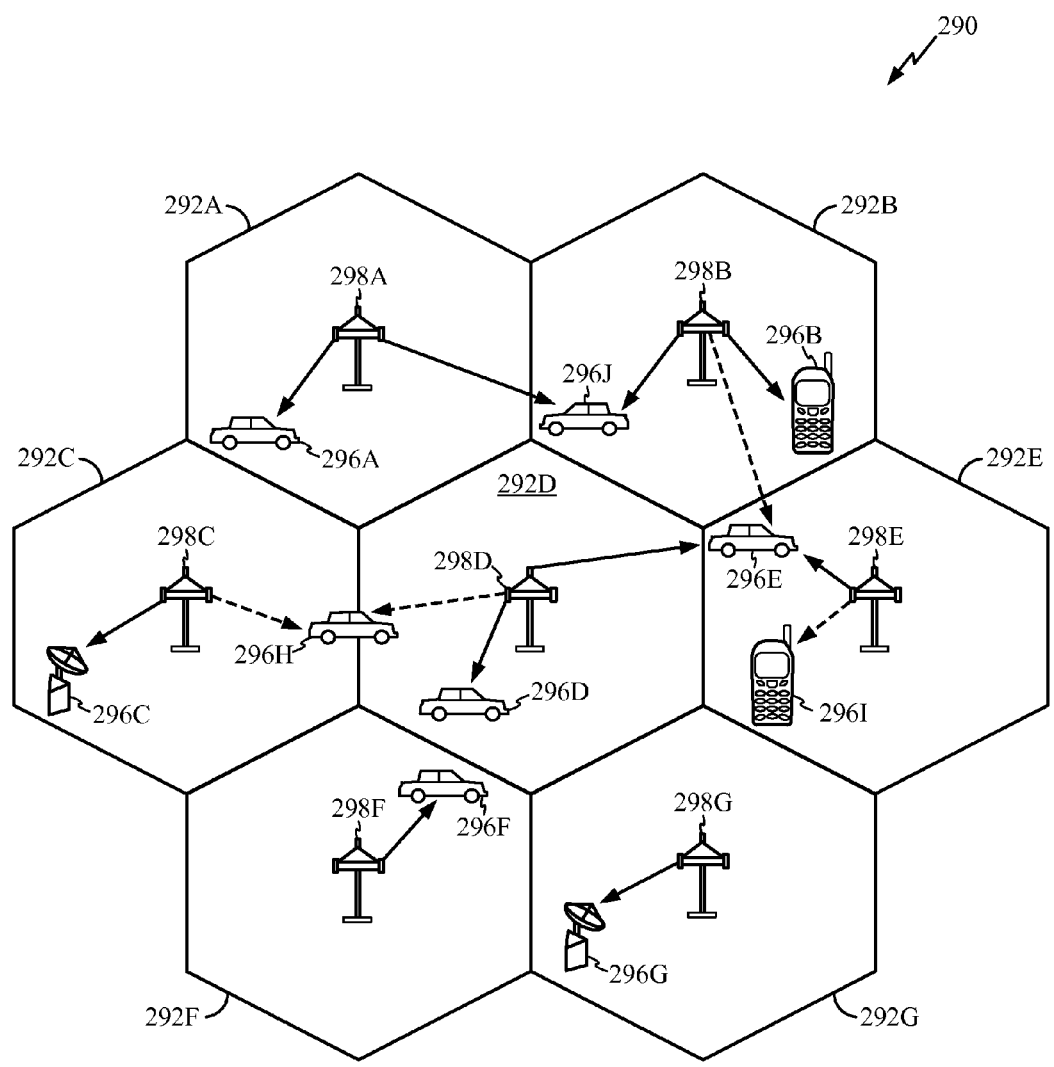
FIG. 2 illustrates an example of a wireless communications system that supports a plurality of user devices.

FIG. 2 illustrates an example of a wireless communications system 290 that supports a plurality of user devices. In FIG. 2, reference numerals 292A to 292G refer to cells, reference numerals 298A to 298G refer to base stations (BS) or node Bs and reference numerals 296A to 296J refer to access user devices (a.k.a. user equipments (UE)). Cell size may vary. Any of a variety of algorithms and methods may be used to schedule transmissions in system 290. System 290 provides communication for a number of cells 292A through 292G, each of which is serviced by a corresponding base station 298A through 298G, respectively.

In one aspect, LTE-Advanced (LTE-A) is a next generation wireless technology evolution in the UMTS protocol family. Desired goals for LTE-A systems include enhanced data rates, up to 1 Gb/s on the downlink, for example. In addition, deployment of LTE-A wireless systems must be backward-compatible with LTE systems to preserve the financial investments made in the preceding LTE infrastructure. Furthermore, another goal for LTE-A systems is improved spectral efficiency, that is, a higher data throughput per unit bandwidth, expressed in bits per second per Hertz (bps/Hz). Improved spectral efficiency is vital to the growth of the wireless communication industry since the available spectral resources for wireless transmission are severely limited and tightly regulated worldwide.

In the present disclosure the first deployment of LTE will be referred to as LTE Release 8 (Rel-8). At present, a modified LTE version is known as LTE Release 9 (Rel-9). A subsequent upgrade of LTE Release 8/9 is referred to, in the present disclosure, as either LTE-Advanced (LTE-A) or LTE Rel-10+. In the present disclosure, the "10+" reference denotes a "Release 10" version or a later version. One skilled in the art would understand that the scope and spirit of the present disclosure is applicable to future upgrades of LTE with the applicable characteristics described herein, regardless of the name assigned to any future upgrade versions.

One proposed feature in LTE-A is known as carrier extension. In this aspect, individual component carriers may be extended to provide a wider bandwidth, up to, for example, 100 MHz.

In one aspect, user equipment (UE) compatible with LTE-A may have a different allocation of system bandwidth than UEs compatible only with LTE Rel-8 due to the usage of carrier extension. Resource assignments and other control data for the LTE Rel-8 or LTE-A downlinks are carried in a message known as the Downlink Control Information (DCI).

In many telecommunication systems, communications networks are used to exchange messages among several interacting spatially-separated devices. The various types of networks may be classified in different aspects. In one example, the geographic scope of the network could be over a wide area, a metropolitan area, a local area, or a personal area, and the corresponding networks would be designated as wide area network (WAN), metropolitan area network (MAN), local area network (LAN), or personal area network (PAN). Networks also differ in the switching/routing technique used to interconnect the various network nodes and devices (e.g. circuit switching vs. packet switching), in the type of physical media employed for transmission (e.g. wired vs. wireless), or in the set of communication protocols used (e.g. Internet protocol suite, SONET (Synchronous Optical Networking), Ethernet, etc.).

One important characteristic of communications networks is the choice of wired or wireless media for the transmission of electrical signals among the constituents of the network. In the case of wired networks, tangible physical media such as copper wire, coaxial cable, fiber optic cable, etc. are employed to propagate guided electromagnetic waveforms which carry message traffic over a distance. Wired networks are a static form of communications networks and are typically favored for interconnection of fixed network elements or for bulk data transfer. For example, fiber optic cables are often the preferred transmission media for very high throughput transport applications over long distances between large network hubs, such as, bulk data transport across or between continents over the Earth's surface.

On the other hand, wireless networks are often preferred when the network elements are mobile with dynamic connectivity needs or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, usage of wireless propagation requires significant active resource management among the network users and high levels of mutual coordination and cooperation for compatible spectrum utilization.

In one example, wireless networks are compatible with various wireless protocols. Exemplary versions of wireless protocols include Universal Mobile Telecommunications System (UMTS), High Speed Downlink Packet Access (HSDPA), High Speed Uplink Packet Access (HSUPA), Long Term Evolution (LTE), etc. Wireless systems compliant with these protocols are used for various communication services such as telephony, messaging, data transfer, emails, Internet access, audio broadcasts, video communications, etc. These wireless systems generally utilize an access node (AN), also known as base station (BS) or Node B, to connect to an individual access terminal (AT), also known as user equipment (UE) or user device, to fixed telecommunications infrastructure networks. In general, a radio coverage area is implemented using a plurality of Node Bs using a cellular-based topological architecture to provide wireless access, also known as an air interface, to the UEs (e.g., user devices). Examples of fixed telecommunications infrastructure networks include the public switched telephony network (PSTN), Internet, private data networks, etc. In one aspect, the Node Bs may be connected to a Radio Network Controller (RNC) to facilitate the interconnection to the fixed telecommunications infrastructure networks.

LTE is an evolution of the UMTS wireless communication standard developed by the Third Generation Partnership Project (3GPP), commencing with Release 8 (Rel-8) of the UMTS protocol family. The LTE physical layer is based on orthogonal frequency division multiplex (OFDM) on the downlink, i.e. from base station or eNodeB to user equipment (UE) and single carrier frequency division multiple access (SC-FDMA) on the uplink, i.e. from the UE to the base station or eNodeB. LTE may also accommodate multiple input multiple output (MIMO) antenna techniques for improved spectral efficiency.

LTE-Advanced (LTE-A) is a further evolution of LTE, currently slated for UMTS Release 10 (Rel-10). Under study for LTE-A are various system enhancements to improve system performance such as cellular coverage, system throughput, quality of service (QoS), etc. One improvement under consideration is the usage of relays in the LTE air interface to provide extended radio coverage for more users. In one aspect, relays are used to minimize the distance between a transmitter and a receiver to enable higher data rates or improved communications performance. In another aspect, there are several alternative relay architectures. For example, one form of relay is known as a layer 3 relay or a self-backhaul which effectively appears as another base station or eNodeB to a UE connected to it. In one aspect, layer refers to the well-known open systems interconnection (OSI) protocol stack model, where layer 3 is also referred to as the "network layer".

Figure 3:
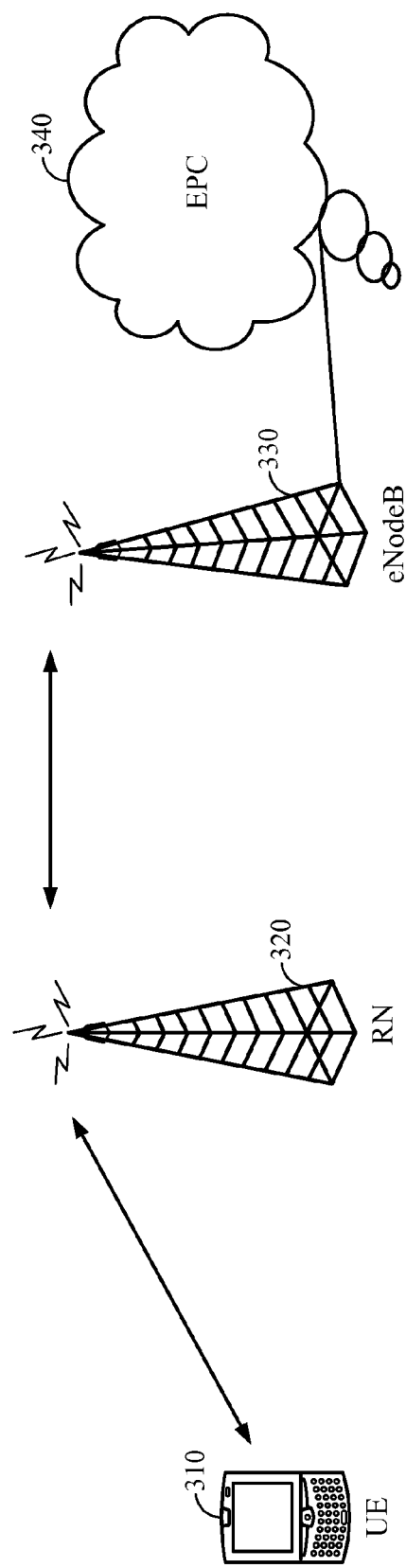
FIG. 3 illustrates an example of a relay architecture in a LTE wireless communication system.

FIG. 3 illustrates an example of a relay architecture in a LTE wireless communication system. A user equipment (UE), or mobile device, 310 is the communications device that a user employs for personal communication services. In one aspect, the UE has an air interface or wireless connection to a relay node (RN) 320, which in turn is wirelessly connected to a base station or eNodeB 330. In one example, the relay node (RN) may be represented by the access node 101 shown in FIG. 1. For example, in the relay context, this eNodeB is also referred to a donor cell. Next, the eNodeB is connected to the evolved packet core (EPC) 340. The EPC provides the network infrastructure to connect the various users of the wireless system to fixed telecommunications assets such as the Public Switched Telephony Network (PSTN), Internet, private data networks, virtual private networks (VPNs), etc. In one example, the EPC is an all-Internet Protocol (IP)-based core network with radio access through well-defined air interfaces.

In one aspect, the wireless connection between the UE and RN is known as an access link. In another aspect, the wireless connection between the RN and eNodeB is known as a backhaul link.

In one aspect, the relay node (RN) employs inband, half-duplex, frequency division duplex (FDD) communications for its wireless connections. Inband refers to the usage of the same spectral resources as the user wireless links, both downlink and uplink. Half-duplex is a transmission mode for a communications device which sequentially alternates between transmitting and receiving (i.e. one-way communications at a time), unlike full-duplex mode which allows simultaneous or virtually simultaneous two-way communications at a time. FDD is a duplexing technique which uses separate frequency bands for the opposite directions of duplex communication, i.e. the downlink is on one frequency band and the uplink is on another frequency band.

In another aspect, LTE wireless systems use sounding reference signals (SRS) to support uplink channel estimation for improved uplink resource allocation. In one example, a UE transmits a SRS uplink to an eNodeB as part of its uplink transmission format.

In one aspect, usage of inband, half-duplex FDD communication in the RN does not allow simultaneous transmission and reception on the same frequency. In another aspect, there is no inherent guard period between transmission sub-frames in the time domain. And, in another aspect, switching the transmitter and receiver on and off introduces communication delays. In one example, there is a desire to create a time boundary for the access link and the backhaul link for both the downlink and uplink without significant changes to the existing physical channel architecture.

Figure 4:
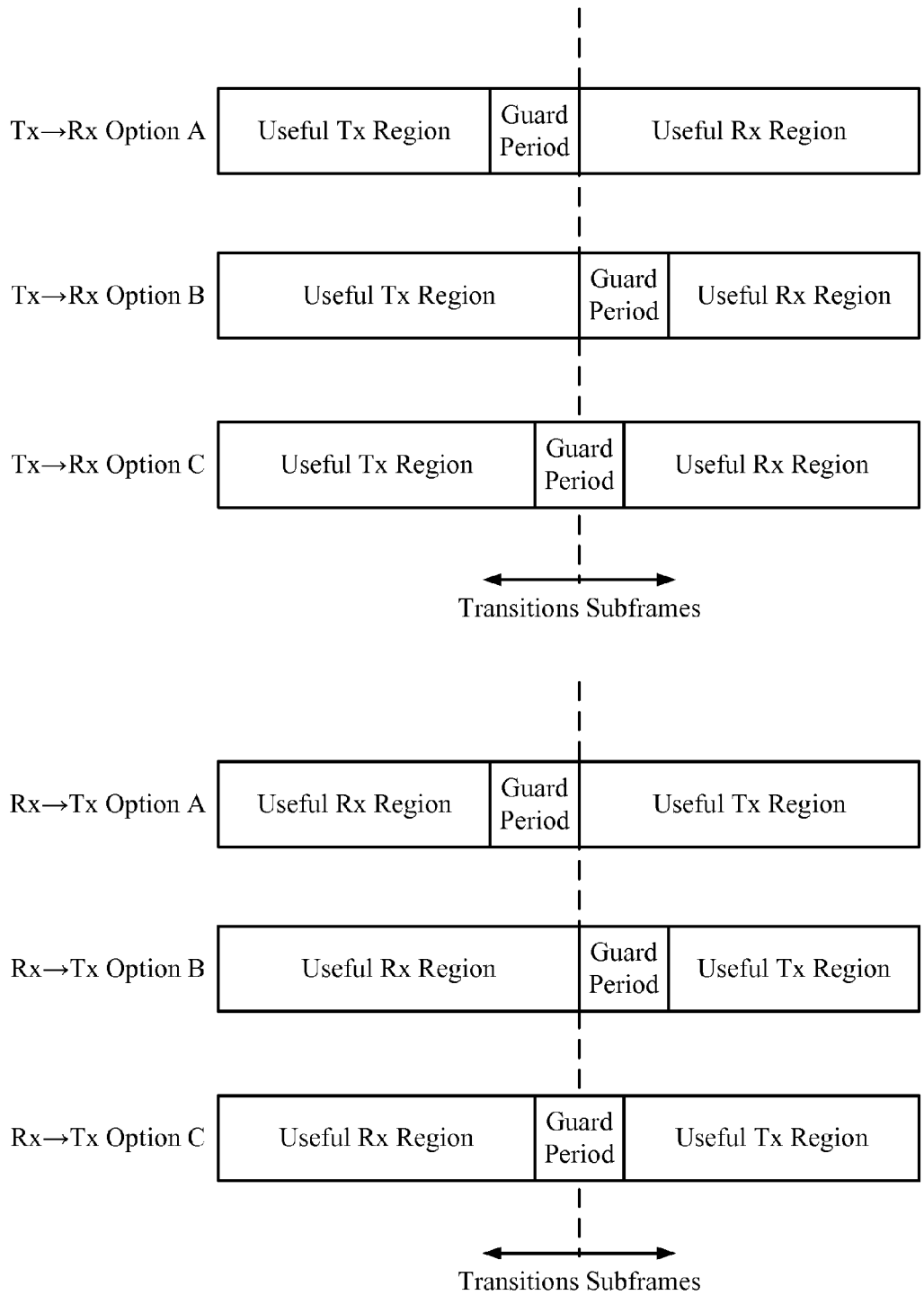
FIG. 4 illustrates an example set of relay transition scenarios between RN transmit sub-frames and receive sub-frames in a half-duplex mode with three example options.

In one aspect, the present disclosure provides solutions with the following features:
- use of a fraction of the cyclic prefix (CP) as a guard period if the RN transmit/receive switching time is small
- use of sounding reference signal (SRS) configured channels to blank out the last OFDM symbol if a larger guard period is needed (e.g., applied to either backhaul link or access link or both)
- if an actual SRS is needed on the backhaul uplink, the RN can be configured to transmit a backhaul uplink channel on consecutive subframes: one for blanking out transmission of the last OFDM symbol and another for a real SRS
- switching time impact can be limited to only the access link by blanking out the last OFDM symbol for transition through the use of SRS configuration (e.g., if an actual SRS is needed on the access link UL, the UE can be configured to transmit a access uplink channel on consecutive subframes: one for blanking out transmission of the last OFDM symbol and another for real SRS)
- RN and UE can negotiate whether the last OFDM symbol should be blanked out by way of SRS configuration in the access link uplink or backhaul link uplink
- on a multicast/broadcast single frequency network (MB-SFN) transition subframe, the RN can be configured to transmit control channels only on the first OFDM symbol; the second OFDM symbol is used for a guard period FIG. 4 illustrates an example set of relay transition scenarios between RN transmit sub-frames and receive sub-frames in a half-duplex mode with three example options. In option A, the ending parts of transmit sub-frames are cut. In option B, the beginning parts of receive sub-frames are cut. In option C, impacts on both transmit and receive at the RN are balanced with a symmetric switching transition.

In one aspect, if the transmit/receive switching time is small, there are several possibilities for the RN to implement a relay transition time. In one example, a fraction of the cyclic prefix (CP) of the first OFDM symbol of the receive sub-frames can be cut to support a guard period. This example corresponds to option B of FIG. 4.

In another example, a fraction of end of the last OFDM symbol of the transmit sub-frames can be cut. This example corresponds to option A of FIG. 4. In another example, apply a symmetric switching transition with a balanced impact on both transmit phase and receive sub-frames. In one aspect, for any of these options, no changes to the LTE physical layer architecture are required.

In another aspect, if the transmit/receive switching time is large, the RN and the wireless network can reserve the entire last OFDM symbol of the transmit sub-frames for a guard period. In one example, for a backhaul uplink, the wireless network could configure a "UE-specific" SRS for the RN. In one example, the RN or donor-eNodeB do not transmit any information during the last OFDM symbol. This option requires a change to the RN transmitter and donor-eNodeB receiver, however. In another aspect, if the RN needs to transmit a real SRS, the donor-eNodeB will configure consecutive RN transmit sub-frames. In another example, for an access downlink, the wireless network could configure a Multicast/Broadcast Single Frequency Network (MBSFN) without transmission on a second OFDM symbol.

Figure 5:
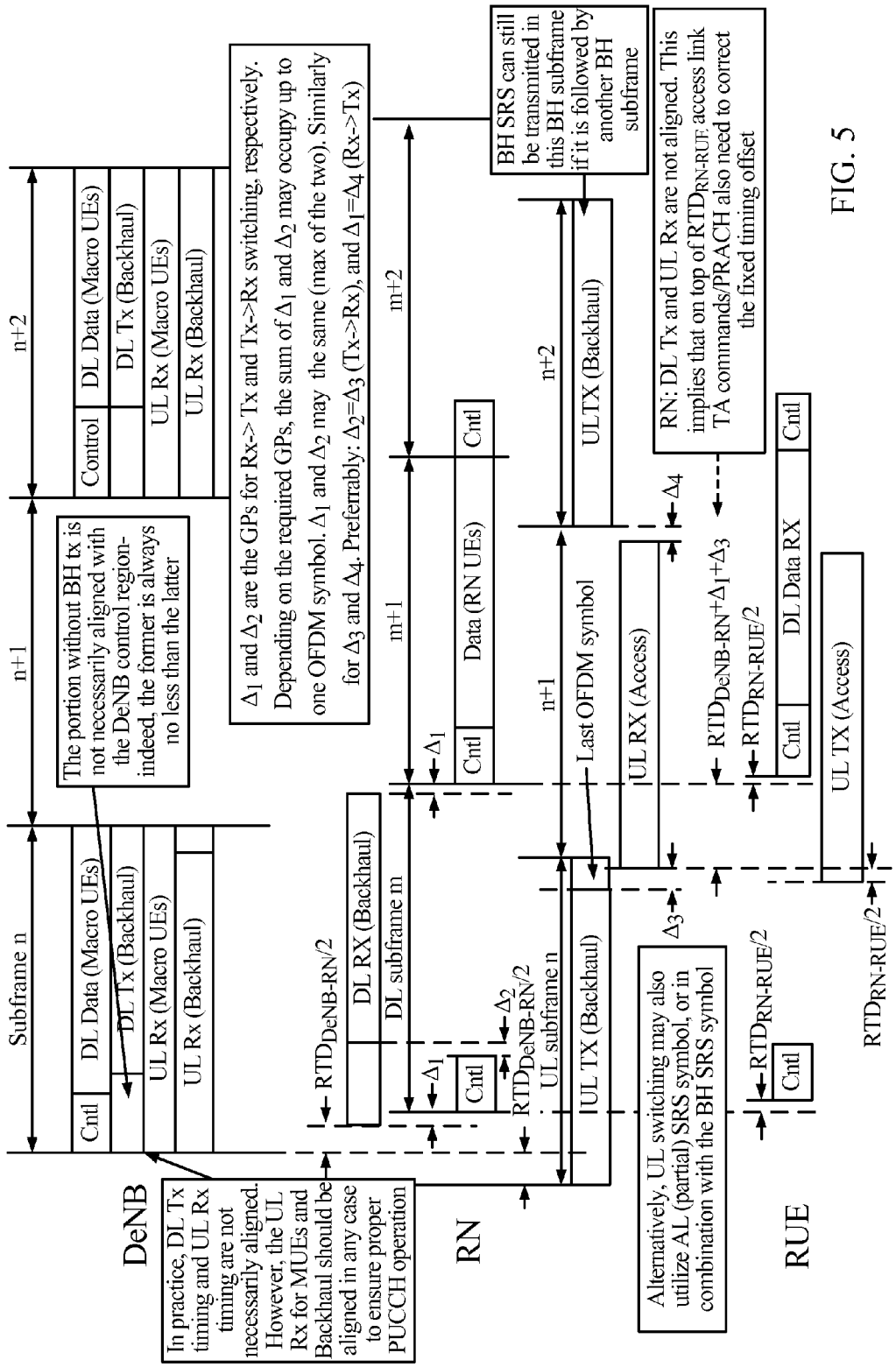
FIG. 5 illustrates an example of a relay backhaul (BH) timeline.

FIG. 5 illustrates an example of a relay backhaul (BH) timeline. Shown in FIG. 5 are various data flows for the donor eNodeB (DeNB) (e.g. eNodeB 330 in FIG. 3), relay node (RN) (e.g. RN 320 in FIG. 3), and relay user equipment (RUE) (e.g., UE 310 in FIG. 3). In one example, it may not be necessary to specify a single timeline design for a RN operation. However, in one aspect, the related backhaul channels and their interaction with UEs should be designed efficiently.

In one aspect, the sounding reference signal (SRS) reception over the access link, for example, between a UE and a RN, is not impacted if the uplink switching impact is localized in the backhaul link, for example between a RN and an eNodeB. In one example, the last OFDM symbol of the backhaul uplink sub-frame is utilized to cover both transmit/receive switching and receive/transmit switching. In another aspect, for SRS transmission over the backhaul link, there are several possible options. In one case, the SRS is not transmitted if the SRS transmit sub-frame is immediately followed by an uplink access link receive sub-frame. In another case, the SRS may be transmitted if the SRS sub-frames are followed by another uplink backhaul sub-frame. For example, if sub-frames n, n+1, ..., n+k are uplink backhaul subframes, the SRS can still be transmitted by the RN in sub-frames n, n+1, ..., n+k+1. In yet another case, the SRS can be transmitted even if the SRS transmit sub-frame is immediately followed by an uplink access sub-frame. For example, a macro could exploit SRS periodicity in the time domain (equivalent to a frequency domain comb) to decode the SRS using the half symbol that is cleanly received. In one option, to enable the SRS transmission over the backhaul link, configure two or more consecutive uplink backhaul sub-frames and configure SRS transmission instances part of sub-frames, for example, via UMTS Rel-8 SRS configurations. In one example, the RN may transmit SRS if the SRS transmit instance belongs to the second case above; otherwise, the RN does not transmit the SRS. Note that the donor eNodeB and RN are always synchronized regarding this situation and that the RN is mostly expectedly to be stationary so that fast SRS transmission is not considered necessary.

However, the impact on hybrid automatic repeat request (H-ARQ) round trip time (RTT) on the access link must also be considered. In one example, consecutive uplink backhaul sub-frame configuration implies that both even and odd H-ARQ process identifiers would be impacted on the access link. For example, localizing the H-ARQ process impact to even or odd identifiers for 10 ms H-ARQ RTT becomes more difficult. In another example, a third delta ($\Delta_3$) value may be adjusted to distribute the impact on access link SRS and backhaul SRS, which can be signaled from the RN to the donor eNodeB.

In another aspect, a virtual SRS transmission may be employed. In one example, a donor eNodeB may configure cell-specific SRS transmission sub-frames, which may be denoted as S1. The donor eNodeB may also configure RN-specific uplink backhaul sub-frames, either explicitly or implicitly, which may be denoted as S2. In one example, the two sets of sub-frames S1 and S2 may not be related such that S2 is a subset of S1, that is, not all uplink backhaul sub-frames are part of S1. Therefore, in one aspect, the RN should interpret the virtual SRS sub-frames as the union of S1 and S2 to utilize the last OFDM symbol in the uplink backhaul for receive/transmit switching and transmit/receive switching.

In another aspect, considerations for acknowledgement (ACK), negative acknowledgement (NAK), and scheduling request (SR) should be recognized. For example, orthogonality among the ACK, NAK, and SR signals must be maintained for the macro UEs and RNs. In one example, the RN uplink always uses shortened ACK/NAK/SR formats under the preferred timing design. In one example, if shortened ACK/NAK/SR formats are enabled for macro UEs, the macro UEs and RN can be multiplexed in one resource block (RB). In another example, if shortened ACK/NAK/SR formats are not enabled for macro UEs, the macro UEs and RN cannot be multiplexed in one resource block (RB); therefore, orthogonality may be achieved via different resource blocks (RBs). For dynamic ACK/NAK of UEs, physical uplink control channel (PUCCH) resources are dynamically derived based on downlink physical downlink control channel (PDCCH) minimum channel control element (CCE) index. For dynamic ACK/NAK of RNs, PUCCH can be derived based on (reverse physical downlink shared channel) R-PDSCH. To ensure orthogonality via different RBs, the same PUCCH resource derivation approach can be applied, but using another constant offset.

Figure 6:
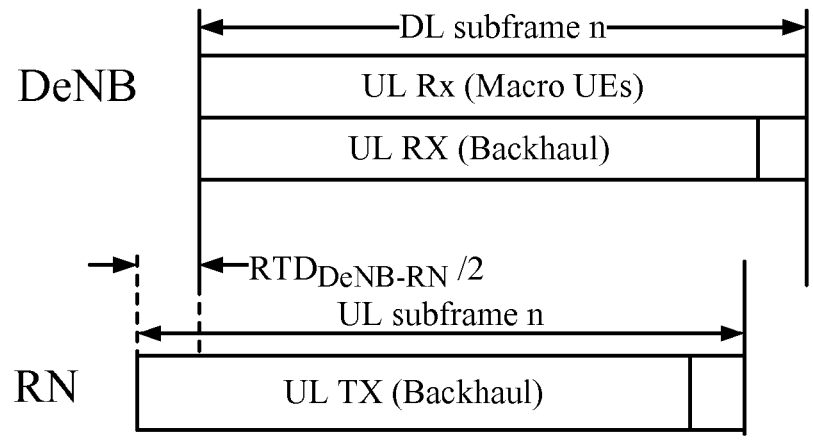
FIG. 6 illustrates an example of a sub-frame relationship between a donor eNodeB (DeNB) and a relay node (RN).

FIG. 6 illustrates an example of a sub-frame relationship between a donor eNodeB (DeNB) and a relay node (RN). Shown are an example downlink frame n from the DeNB and an example uplink subframe n from the RN.

Figure 7:
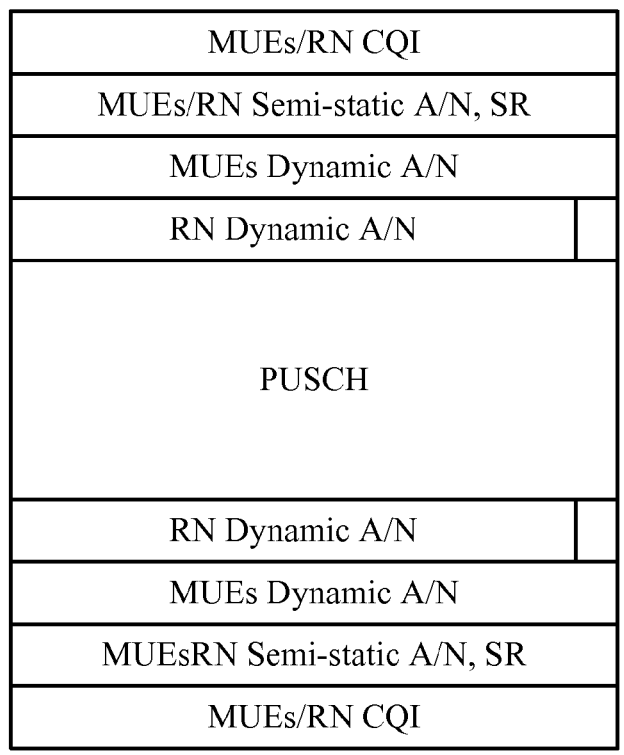
FIG. 7 illustrates an example of an uplink structure for RN dynamic ACK/NACK resources derivation.

FIG. 7 illustrates an example of an uplink structure for RN dynamic ACK/NAK resources derivation. In one aspect, a minimum CCE of R-PDCCH and another layer 3 channel signaled are constant. In another aspect, the last symbol of RN dynamic ACK/NAK may or may not be punctured depending on configuration and the value of time offset $\Delta_3$. For example, this situation may occur if the time offset $\Delta_3$ is such that the impact is localized to the access link, or if the uplink backhaul sub-frame is followed by another backhaul structure.

Figure 8:
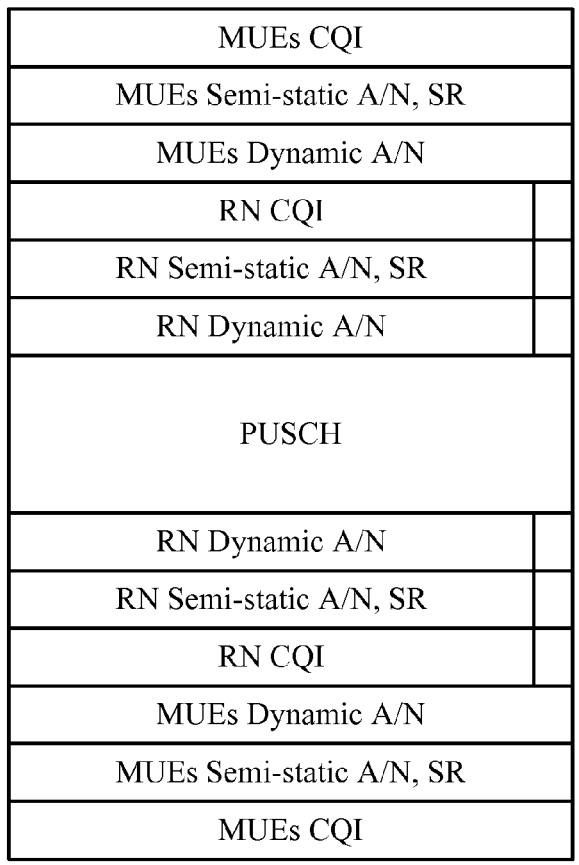
FIG. 8 illustrates an example of a time offset format for uplink structure for RN dynamic ACK/NACK resources derivation.

FIG. 8 illustrates an example of a time offset format for uplink structure for RN dynamic ACK/NAK resources derivation. In an additional aspect, a time offset can be applied to RN channel quality indicator (CQI), RN SPS ACK/NAK and SR as well, as illustrated in FIG. 8. In one example, there is a clear cut between the PUCCH for macro UEs and the PUCCH for RNs.

In an additional aspect, the amount of RN dynamic ACK/NAK may small, for example, less than 10. The amount of macro UE dynamic ACK/NAK resource, in one example, is much larger than that of RN dynamic ACK/NAK. Consequently, two design options (D1 & D2) for ACK/NAK/SR may be considered:

Option D1—RN ACK/NAK is semi-statically configured in responding to R-PDCCH. In one example, one ACK/NAK may be configured with multiple ACK/NAK and is informed via R-PDCCH which one to use.

Option D2—RN dynamic ACK/NAK and macro UEs dynamic ACK/NAK are rearranged such that macro UE ACK/NAK is located after the RN dynamic ACK/NAK. In one aspect, this option results in more efficient re-use of the reserved but non-used ACK/NAK resource, as illustrated in FIG. 9.

Figure 9:
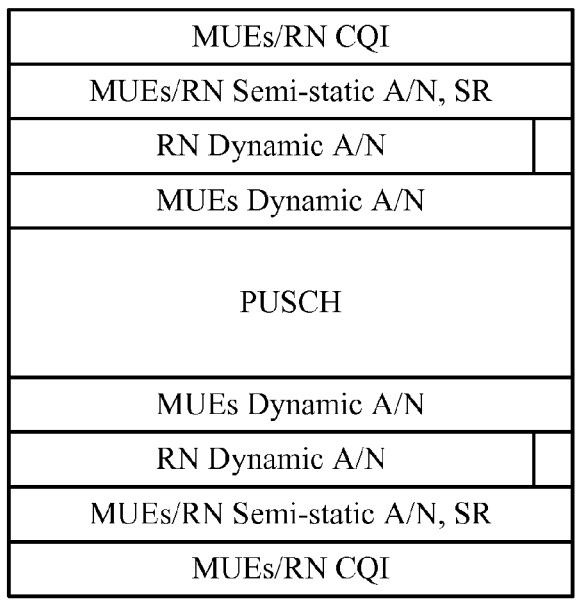
FIG. 9 illustrates a second example of an uplink structure for RN dynamic ACK/NACK resources derivation.

FIG. 9 illustrates a second example of an uplink structure for RN dynamic ACK/NACK resources derivation.

In another aspect, orthogonality of the channel quality indicator (CQI) should be maintained among macro UEs and RNs. In one example, a RN uplink can use a new shortened CQI format for the second slot under the preferred timing design or just use the existing formats with the last symbol being punctured. In another example, if macro UEs and RN cannot be multiplexed in one resource block (RB), then orthogonality may be achieved via different RBs, achievable by layer 3 configurations. As another option, PUSCH based CQI support may be used.

Figure 10:
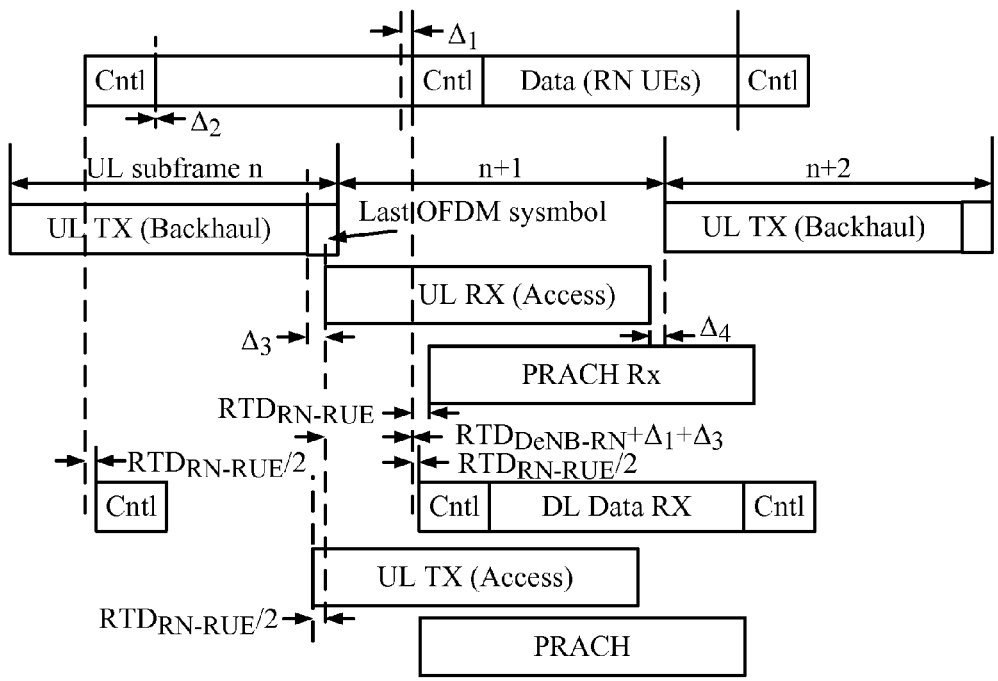
FIG. 10 illustrates examples of various aspects of PRACH timing.

In another aspect, design considerations for a primary random access channel (PRACH) timing advance (TA) should be accommodated. In one aspect, PRACH assumes no timing advance, that is NTA=0 and bases its transmission timing on the downlink reception timeline. In one example, PRACH and TA commands are designed to support up to 100 km range. FIG. 10 illustrates examples of various aspects of PRACH timing.

In one aspect, the goal of coverage extension using relay nodes is to extend reasonable service levels to bad channel UEs under macro only scenarios. In one example, the RN may need to handle two different uplink receive timing scenarios, one for PUCCH/PUSCH, the other for PRACH. In one aspect, the RN can better detect PRACH since it knows the timing offset a priori. In one example, if the same uplink receive timing scenario is used, PRACH may be forced to use formats requiring 2 or 3 sub-frames to account for the timing offset. The timing offset could also be broadcast such that LTE-AUEs take advantage of this broadcasted information for PRACH transmission.

In another aspect, design considerations for coordinated multipoint (CoMP) should be accommodated. For example, in the downlink CoMP between a donor eNodeB and RN, various downlink propagation delay constraints should be recognized. Similarly, in the uplink CoMP, various uplink propagation delay constraints should be recognized.

In another aspect, the downlink transmitter and the uplink receiver timing may not be aligned. Consequently, in one example, it may be unreliable for an RN to derive the backhaul propagation delay based on Macro signals. In one example, a Donor eNodeB may unicast to each RN the relay backhaul propagation delay values to improve synchronization. In another example, a Donor eNodeB may either broadcast or unicast an eNodeB receive-transmit time difference for a group of RNs. For example, the RN receives a relay backhaul propagation delay value from a Donor eNodeB and applies this relay backhaul propagation delay value as a correction value for synchronization. One skilled in the art would understand that in one aspect, the relay backhaul propagation delay value is an estimated value.

Although a Relay node (RN) was used in the previous examples, in another aspect, the present disclosure may also be used for other network nodes besides a Relay Node (RN). Other network nodes may be any nodes which obtain time and frequency synchronization via network listening, i.e., by monitoring the downlink (DL) transmissions of another eNodeB. For example, other network nodes may include, but is not limited to, a home eNodeB (HeNB), a femtocell, a picocell, etc. In one example, a femtocell or picocell are smaller sized cells. One skilled in the art would understand that the list of network nodes listed herein is not a comprehensive list. Neither is it an exclusive list. Other network nodes may be included without affecting the scope or spirit of the present disclosure.

Figure 11:
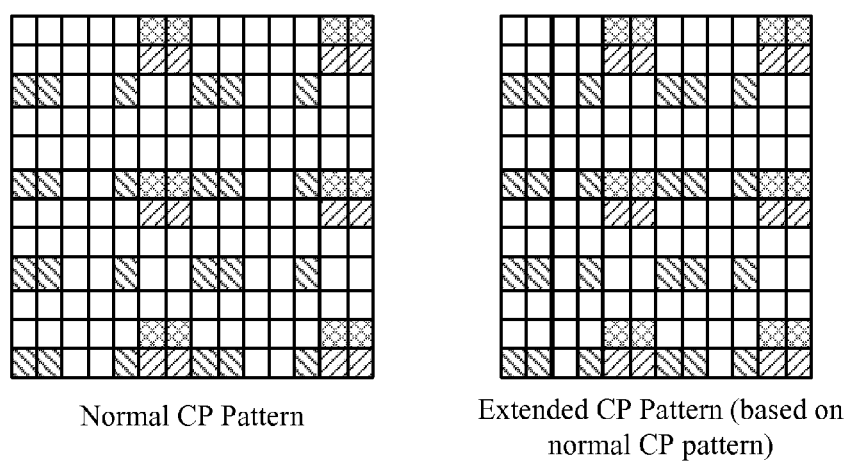
FIG. 11 illustrates examples of a normal cyclic prefix (CP) pattern and an extended cyclic prefix (CP) pattern.

FIG. 11 illustrates examples of a normal cyclic prefix (CP) pattern and an extended cyclic prefix (CP) pattern. In one example, using the above timing design, the DM-RS patterns designed for macro UEs for both the normal CP and the extended CP case can be reused for the downlink backhaul.

In another aspect, for downlink timing, the timing offset can also be chosen to account for the potential removal of the cyclic prefix (CP). In one aspect, from the relay node (RN) transmit-to-receive transition, the RN may choose not to receive the first CP of the downlink backhaul link. In another aspect, from the RN receive-to-transmit transition, the RN may choose not to transmit the first CP of the downlink access link. In another example, either option or a combination may be selected which will result in a total timing offset, for example, of approximately 10 microseconds. In this example case, only a 12 microsecond offset is necessary, and in one example, the switching time is effectively reduced to 12 microseconds for a transmit-to-receive transition and for a receive-to-transmit transition.

Figure 12:
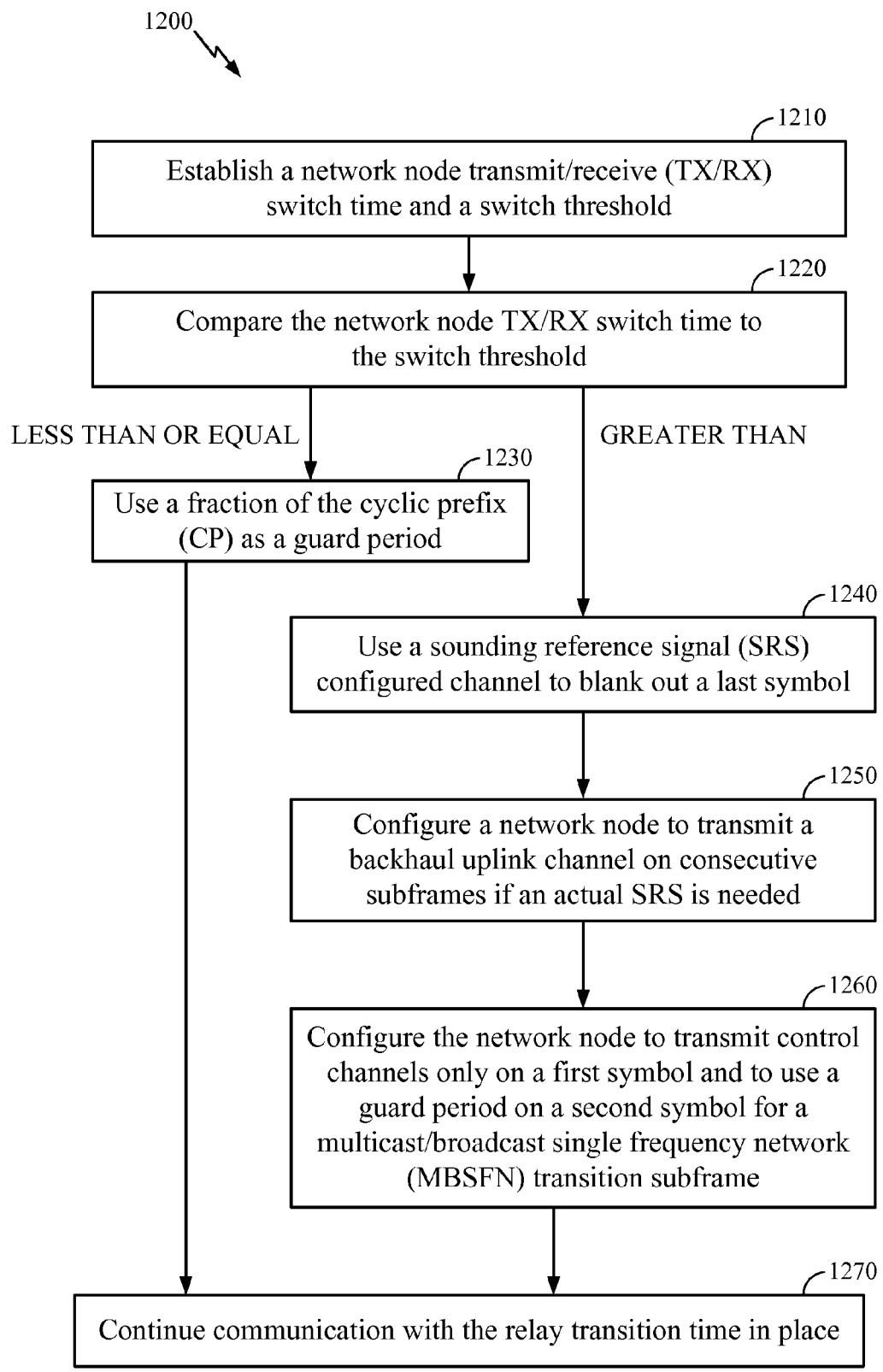
FIG. 12 illustrates an example flow diagram for establishing a relay transition time in a network node in a wireless communication system.

FIG. 12 illustrates an example flow diagram 1200 for establishing a relay transition time in a network node in a wireless communication system. In one example, the network node utilizes half duplex frequency division duplex (FDD) transmission. In one example, the wireless communication system is based on LTE-A. In block 1210, establish a network node transmit/receive (TX/RX) switch time and a switch threshold. In block 1220, compare the network node TX/RX switch time to the switch threshold. In one example, the switch threshold is related to a symbol period, for example, an OFDM symbol period. If the network node TX/RX switch time is less than the switch threshold, proceed to block 1230. If the network node TX/RX switch time is greater than or equal to the switch threshold, proceed to block 1240.

In block 1230, use a fraction of the cyclic prefix (CP) as a guard period. In one example, use a fraction of the CP of a first symbol of at least one receive sub-frames. In another example, use a fraction of the CP of a last symbol of at least one transmit sub-frames. In yet another example, use a fraction of the CP from both receive and transmit sub-frames symmetrically. Following block 1230, proceed to block 1270.

In one example, choose to not receive a first cyclic prefix (CP) of a downlink backhaul link for the network node transmit-to-receive transition period. In one example, choose to not transmit a first cyclic prefix (CP) of a downlink access link for the network node receive-to-transmit transition period.

In block 1240, use a sounding reference signal (SRS) configured channel to blank out a last symbol. In one example, the last symbol is an OFDM symbol. In one example, configure a UE-specific SRS for the network node for a backhaul uplink. In another example, a network node and a UE negotiate when the last symbol is blanked out by using a SRS configuration in an access uplink or a backhaul uplink.

In one example, the network node is one of the following: relay node (RN), home eNodeB (HeNB), a femtocell or a picocell. In one example, the network node is a device for monitoring the downlink (DL) transmissions of a eNodeB. In one example, the eNodeB receives a transmit time difference for the network node either through broadcasting or unicasting. In another example, network node receives unicasting of a plurality of relay backhaul propagation delay values Following block 1240, in block 1250, configure a network node to transmit a backhaul uplink channel on consecutive subframes if an actual SRS is needed. In one example, one of the consecutive subframes is for blanking out transmission of a last symbol and another of the consecutive subframes is used for the actual SRS.

In block 1260 configure the network node to transmit control channels only on a first symbol and to use a guard period on a second symbol for a multicast/broadcast single frequency network (MBSFN) transition subframe.

After block 1260, proceed to block 1270. In block 1270, continue communication with the relay transition time in place. In one aspect, one or more of the steps presented in FIG. 12 is performed by one or more of the following components shown in FIG. 1: processor A 180, Tx data processor A 110, Rx data processor A 170 or receiver A 150.

One skilled in the art would understand that the steps disclosed in the example flow diagram in FIG. 12 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 13:
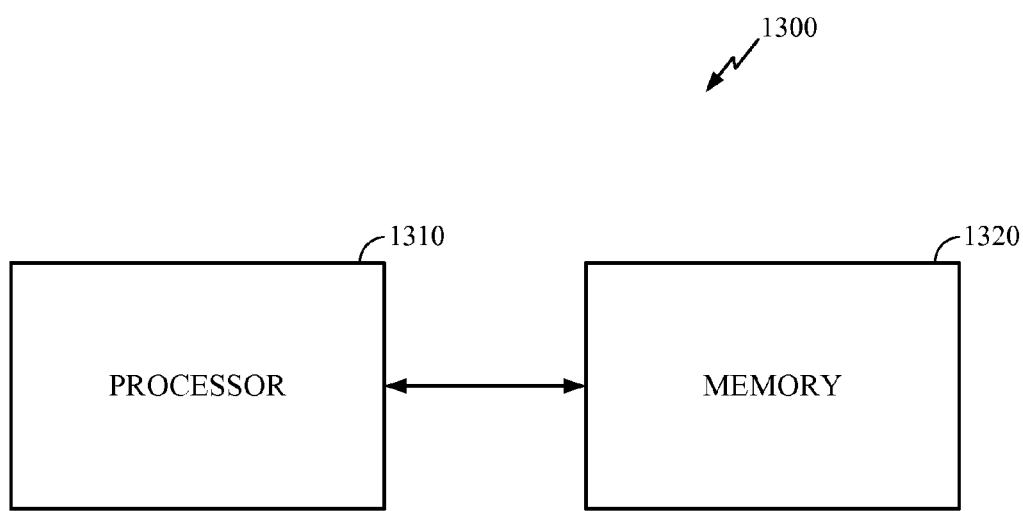
FIG. 13 illustrates an example of a device comprising a processor in communication with a memory for executing the processes for establishing a relay transition time in a network node in a wireless communication system.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 13 illustrates an example of a device 1300 comprising a processor 1310 in communication with a memory 1320 for executing the processes for establishing a relay transition time in a network node in a wireless communication system. In one example, the device 1300 is used to implement the algorithm illustrated in FIG. 12. In one aspect, the memory 1320 is located within the processor 1310. In another aspect, the memory 1320 is external to the processor 1310. In one aspect, the processor includes circuitry for implementing or performing the various flow diagrams, logical blocks and/or modules described herein.

Figure 14:
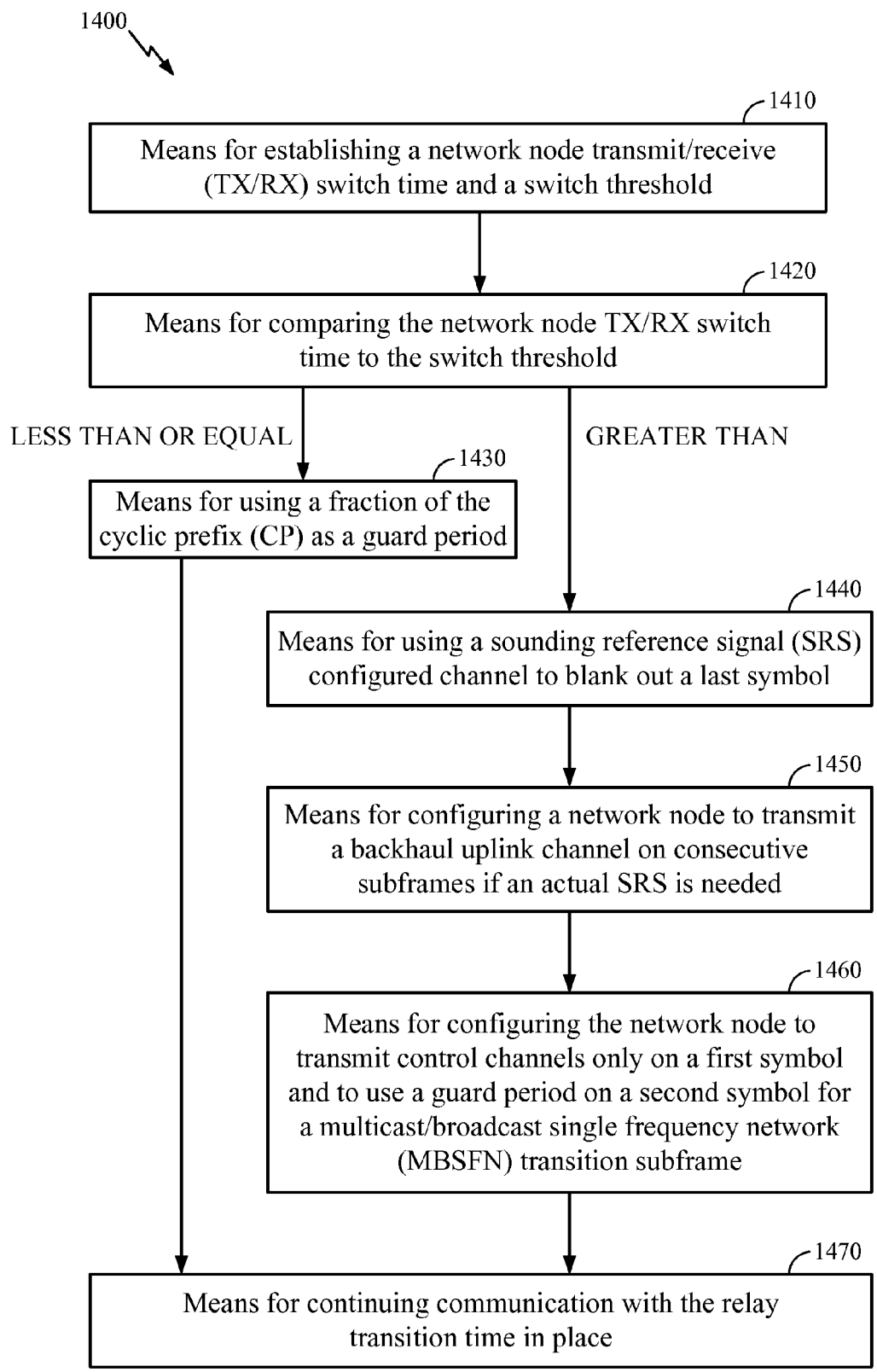
FIG. 14 illustrates an example of a device suitable for establishing a relay transition time in a network node in a wireless communication system.

FIG. 14 illustrates an example of a device 1400 suitable for establishing a relay transition time in a network node in a wireless communication system. In one aspect, the device 1400 is implemented by at least one processor comprising one or more modules configured to provide different aspects of establishing a relay transition time in a network node in a wireless communication system as described herein in blocks 1410, 1420, 1430, 1440, 1450, 1460 and 1470. For example, each module comprises hardware, firmware, software, or any combination thereof. In one aspect, the device 1400 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for establishing a relay transition time in a network node in a wireless communication system comprising:
comparing a network node transmit/receive (TX/RX) switch time to a switch threshold; and
using a fraction of the cyclic prefix (CP) as a guard period if the network node TX/RX switch time is less than or equal to the switch threshold, or
using a sounding reference signal (SRS) configured channel to blank out a last symbol if the network node TX/RX switch time is greater than the switch threshold.

2. The method of claim 1 wherein the fraction of the cyclic prefix (CP) is either of a first symbol of at least one receive sub-frames or of a last symbol of at least one transmit sub-frames.

3. The method of claim 1 wherein the fraction of the cyclic prefix (CP) is from both receive and transmit sub-frames symmetrically.

4. The method of claim 1 further comprising choosing to not receive a first cyclic prefix (CP) of a downlink backhaul link for a network node transmit-to-receive transition period.

5. The method of claim 4 further comprising choosing to not transmit a first cyclic prefix (CP) of a downlink access link for the network node receive-to-transmit transition period.

6. The method of claim 1 further comprising configuring the network node to transmit a backhaul uplink channel on consecutive subframes if an actual SRS is needed.

7. The method of claim 6 wherein one of the consecutive subframes is for blanking out transmission of a last symbol and another of the consecutive subframes is used for the actual SRS.

8. The method of claim 6 further comprising configuring the network node to transmit control channels only on a first symbol and to use a guard period on a second symbol for a multicast/broadcast single frequency network (MBSFN) transition subframe.

9. The method of claim 8 further comprising establishing a network node transmit/receive (TX/RX) switch time and a switch threshold, wherein the switch threshold is related to an OFDM symbol period.

10. The method of claim 1 wherein the network node is one of the following: relay node (RN), home eNodeB (HeNB), a femtocell or a picocell.

11. The method of claim 1 further comprising performing one of the following: configuring a UE-specific SRS for the network node for a backhaul uplink or negotiating when a last symbol is blanked out by using a SRS configuration in an access uplink or a backhaul uplink.

12. The method of claim 11 wherein the network node monitors downlink (DL) transmissions of a eNodeB.

13. The method of claim 12 wherein the eNodeB receives a transmit time difference for the network node either through broadcasting or unicasting.

14. The method of claim 11 wherein the network node receives unicasting of a plurality of relay backhaul propagation delay values.

15. An apparatus for establishing a relay transition time in a network node in a wireless communication system comprising:
means for comparing a network node transmit/receive (TX/RX) switch time to a switch threshold;
means for using a fraction of the cyclic prefix (CP) as a guard period if the network node TX/RX switch time is less than or equal to the switch threshold; and
means for using a sounding reference signal (SRS) configured channel to blank out a last symbol if the network node TX/RX switch time is greater than the switch threshold.

16. The apparatus of claim 15 wherein the fraction of the cyclic prefix (CP) is either of a first symbol of at least one receive sub-frames or of a last symbol of at least one transmit sub-frames.

17. The apparatus of claim 15 wherein the fraction of the cyclic prefix (CP) is from both receive and transmit sub-frames symmetrically.

18. The apparatus of claim 15 further comprising means for choosing to not receive a first cyclic prefix (CP) of a downlink backhaul link for a network node transmit-to-receive transition period.

19. The apparatus of claim 18 further comprising means for choosing to not transmit a first cyclic prefix (CP) of a downlink access link for the network node receive-to-transmit transition period.

20. The apparatus of claim 15 further comprising means for configuring the network node to transmit a backhaul uplink channel on consecutive subframes if an actual SRS is needed.

21. The apparatus of claim 20 wherein one of the consecutive subframes is for blanking out transmission of a last symbol and another of the consecutive subframes is used for the actual SRS.

22. The apparatus of claim 20 further comprising means for configuring the network node to transmit control channels only on a first symbol and to use a guard period on a second symbol for a multicast/broadcast single frequency network (MBSFN) transition subframe.

23. The apparatus of claim 22 further comprising means for establishing a network node transmit/receive (TX/RX) switch time and a switch threshold, wherein the switch threshold is related to an OFDM symbol period.

24. The apparatus of claim 15 wherein the network node is one of the following: relay node (RN), home eNodeB (HeNB), a femtocell or a picocell.

25. The apparatus of claim 15 further comprising means for performing one of the following: configuring a UE-specific SRS for the network node for a backhaul uplink or negotiating when a last symbol is blanked out by using a SRS configuration in an access uplink or a backhaul uplink.

26. The apparatus of claim 25 wherein the network node monitors downlink (DL) transmissions of an eNodeB.

27. The apparatus of claim 26 wherein the eNodeB receives a transmit time difference for the network node either through broadcasting or unicasting.

28. The apparatus of claim 25 wherein the network node receives unicasting of a plurality of relay backhaul propagation delay values.

29. An apparatus for establishing a relay transition time in a network node in a wireless communication system, the apparatus comprising a processor and a memory, the memory containing program code executable by the processor for performing the following:
    comparing a network node transmit/receive (TX/RX) switch time to a switch threshold; and
    using a fraction of the cyclic prefix (CP) as a guard period if the network node TX/RX switch time is less than or equal to the switch threshold, or
    using a sounding reference signal (SRS) configured channel to blank out a last symbol if the network node TX/RX switch time is greater than the switch threshold.

30. The apparatus of claim 29 wherein the fraction of the cyclic prefix (CP) is one of the following: of a first symbol of at least one receive sub-frames, of a last symbol of at least one transmit sub-frames or is from both receive and transmit sub-frames symmetrically.

31. The apparatus of claim 29 wherein the memory further comprising program code for choosing to not receive a first cyclic prefix (CP) of a downlink backhaul link for a network node transmit-to-receive transition period and program code for choosing to not transmit a first cyclic prefix (CP) of a downlink access link for the network node receive-to-transmit transition period.

32. The apparatus of claim 29 wherein the memory further comprising program code for configuring the network node to transmit a backhaul uplink channel on consecutive subframes if an actual SRS is needed.

33. The apparatus of claim 32 wherein one of the consecutive subframes is for blanking out transmission of a last symbol and another of the consecutive subframes is used for the actual SRS.

34. The apparatus of claim 32 wherein the memory further comprising program code for configuring the network node to transmit control channels only on a first symbol and to use a guard period on a second symbol for a multicast/broadcast single frequency network (MBSFN) transition subframe.

35. The apparatus of claim 29 wherein the network node is one of the following: relay node (RN), home eNodeB (HeNB), a femtocell or a picocell.

36. The apparatus of claim 29 wherein the memory further comprising program code for performing one of the following: configuring a UE-specific SRS for the network node for a backhaul uplink or negotiating when a last symbol is blanked out by using a SRS configuration in an access uplink or a backhaul uplink.

37. The apparatus of claim 36 wherein the network node monitors downlink (DL) transmissions of an eNodeB and wherein the eNodeB receives a transmit time difference for the network node either through broadcasting or unicasting.

38. The apparatus of claim 36 wherein the network node receives unicasting of a plurality of relay backhaul propagation delay values.

39. A non-transitory computer-readable medium storing a computer program, wherein execution of the computer program is for:
    comparing a network node transmit/receive (TX/RX) switch time to a switch threshold; and
    using a fraction of the cyclic prefix (CP) as a guard period if the network node TX/RX switch time is less than or equal to the switch threshold, or
    using a sounding reference signal (SRS) configured channel to blank out a last symbol if the network node TX/RX switch time is greater than the switch threshold.

40. The non-transitory computer-readable medium of claim 39 wherein the fraction of the cyclic prefix (CP) is either of a first symbol of at least one receive sub-frames or of a last symbol of at least one transmit sub-frames.

41. The non-transitory computer-readable medium of claim 39 wherein the fraction of the cyclic prefix (CP) is from both receive and transmit sub-frames symmetrically.

42. The non-transitory computer-readable medium of claim 39 wherein execution of the computer program is also for choosing to not receive a first cyclic prefix (CP) of a downlink backhaul link for a network node transmit-to-receive transition period and choosing to not transmit a first cyclic prefix (CP) of a downlink access link for the network node receive-to-transmit transition period.

43. The non-transitory computer-readable medium of claim 39 wherein execution of the computer program is also for configuring the network node to transmit a backhaul uplink channel on consecutive subframes if an actual SRS is needed.

44. The non-transitory computer-readable medium of claim 43 wherein one of the consecutive subframes is for blanking out transmission of a last symbol and another of the consecutive subframes is used for the actual SRS.

45. The non-transitory computer-readable medium of claim 43 wherein execution of the computer program is also for configuring the network node to transmit control channels only on a first symbol and to use a guard period on a second symbol for a multicast/broadcast single frequency network (MBSFN) transition subframe.

46. The non-transitory computer-readable medium of claim 45 wherein execution of the computer program is also for establishing a network node transmit/receive (TX/RX) switch time and a switch threshold, wherein the switch threshold is related to an OFDM symbol period.

47. The non-transitory computer-readable medium of claim 39 wherein the network node is one of the following: relay node (RN), home eNodeB (HeNB), a femtocell or a picocell.

48. The non-transitory computer-readable medium of claim 39 wherein execution of the computer program is also for performing one of the following: configuring a UE-specific SRS for the network node for a backhaul uplink or negotiating when a last symbol is blanked out by using a SRS configuration in an access uplink or a backhaul uplink.

49. The non-transitory computer-readable medium of claim 48 wherein the network node monitors downlink (DL)

transmissions of an eNodeB, wherein the eNodeB receives a transmit time difference for the network node either through broadcasting or unicasting.

50. The non-transitory computer-readable medium of claim 48 wherein the network node receives unicasting of a plurality of relay backhaul propagation delay values.

* * * * *